United States Patent [19]

Ohta et al.

[11] Patent Number: 5,024,910
[45] Date of Patent: Jun. 18, 1991

[54] OPTICAL INFORMATION RECORDING MEDIUM

[75] Inventors: Takeo Ohta, Nara; Masami Uchida, Osaka; Koichi Kotera, Kawanishi; Kunihiro Matsubara, Osaka, all of Japan

[73] Assignee: Matsushita Electric Industrial Co., Ltd., Japan

[21] Appl. No.: 378,521

[22] PCT Filed: Sep. 16, 1988

[86] PCT No.: PCT/JP88/00937
§ 371 Date: Jun. 21, 1989
§ 102(e) Date: Jun. 21, 1989

[87] PCT Pub. No.: WO89/04043
PCT Pub. Date: May 5, 1989

[30] Foreign Application Priority Data

Oct. 28, 1987 [JP] Japan .................................. 62-272502

[51] Int. Cl.$^5$ .............................................. G03C 1/00
[52] U.S. Cl. ........................................ 430/19; 430/270; 430/495; 430/945; 428/64; 346/135.1
[58] Field of Search ................... 430/945, 495, 270, 19; 346/135.1

[56] References Cited

U.S. PATENT DOCUMENTS 4,499,178 2/1985 Wada et al. ........................ 430/495
4,670,345 6/1987 Morimoto et al. ............... 346/135.1

FOREIGN PATENT DOCUMENTS 53-141040 8/1978 Japan .................................. 346/135.1
61-89889 8/1986 Japan .................................. 430/945
62-196181 8/1987 Japan .
62-209742 9/1987 Japan .

OTHER PUBLICATIONS

Bordas, S.; M. T. Clavaguera-Mora, B. Lengendre, Chhay Hancheng, "Phase Diagram of the Ternary System Ge-Sb-Te", Thermochimica Acta, vol. 107, (1986), pp. 239-265.

Primary Examiner—Charles L. Bowers, Jr.
Assistant Examiner—Ashley I. Pezzner
Attorney, Agent, or Firm—Lowe, Price, LeBlanc, Becker & Shur

[57] ABSTRACT

This invention provides an optical information recording medium whose recording thin film is made of three components of GeTe, $Sb_2Te_3$ and Sb derived from a GeTe alloy, an $Sb_2Te_3$ alloy and excess Sb and which is capable of recording, reproduction and erasure. By this, optical disk files which have a stable cycle characteristic and are practically useful can be realized.

6 Claims, 2 Drawing Sheets

OPTICAL INFORMATION RECORDING MEDIUM

TECHNICAL FIELD

This invention relates to optical information recording mediums which enable information to be recorded, reproduced and erased by means of laser beams in high density and in large capacity.

TECHNICAL BACKGROUND

There is known as an optical disk memory a disk of the write-once type using a thin film of $TeO_x$ ($0<x<2.0$) mainly composed of Te and $TeO_2$. A chalcogen material, $Ge_{15}Te_{81}Sb_2S_2$, is also known as reported by S. R. Ovshinsky. This material is utilizable for recording information by heating and melting it by application of a laser beam and quenching for amorphization. The recorded information can be erased by heating by irradiation with a laser beam and subsequent gradual cooling for crystallization. Moreover, thin films made of combinations of chalcogens and the elements of the Group V or VI of the Periodic Table such as Ge, e.g. $As_2S_3$, $As_2Se_3$ or $Sb_2S_3$, are widely known.

One of procedures of recording information on these thin films by means of a laser beam and erasing the information is described. A thin film is initially crystallized and a laser beam with about 1 $\mu m \phi$ whose intensity is modulated according to information is applied, for example, to a recording disk having a thin film thereon under conditions of rotation of the disk. Portions where irradiated with the laser beam are heated to a temperature higher than the melting point of the thin film and then quickly cooled, thereby causing the information to be recorded as amorphous dots. For the erasure of the information, a spot beam which is elongated along the direction of rotating track or tracks of the disk is irradiated, so that the thin film is heated and is then recrystallized by the effect of gradual cooling with the elongated spot beam.

In recording mediums where information is recorded and erased through heating, temperature rise, melting, quenching and heating, temperature rise, gradual cooling, respectively, by laser beam irradiation of the thin film, the quality of signals may vary in correspondence with the heating cycle. The variation is considered to result from thermal, mechanical damages of a material for substrate which are produced by repetition of a number of cycles of rapid heating over 400° C. by application of a recording spot beam and an erasing spot beam and cooling. In addition, the recording thin film may suffer thermal, mechanical damages. Depending on the composition, the recording thin film may undergo a local change in the composition, component of the film or so-called segregation.

A problem has been involved in that where the substrate or recording film undergoes such a change as mentioned above, an increasing number of noises generate and the cycle characteristic deteriorates during the recording, reproducing and erasing cycles.

DISCLOSURE OF THE INVENTION

This invention relates to the art of recording and erasure of optical information by thermally changing the state of thin film by irradiation, for example, of a laser beam and has for its object the improvement in the cycle characteristics of recording and erasure. The invention is characterized in that the thin film used is formed of three components of GeTe, $Sb_2Te_3$ and Sb and that when the molar ratio of $Sb/Sb_2Te$ is taken as b, $0.3<b<0.8$ (wherein b=excess $Sb/Sb_2Te_3$).

When $Sb_2Te_3$ (melting point: 622° C.) is converted into a thin film, an amorphous film is obtained. This film undergoes a change between amorphization and crystallization and is usable for recording. However, its blackening (involving crystallization) temperature is as low as 100° C. and is thus thermally unstable. Mixing of GeTe having a high melting point, Tm=725° C., can raise the blackening (crystallization) temperature over 180° C. Although the thin film of the mixture has good thermal stability, the quality of signal is liable to lower when repeating the cycle of recording (amorphization), erasure (crystallization) or the cycle of the reverse mode of erasure, recording.

To overcome the above drawback, excess Sb is added. Sb has the action of inhibiting the phase separation between GeTe and $Sb_2Te_3$ components and improves the cycle characteristic. Further, it is expected to work as nuclei for the crystallization and to bring about an improvement in recording and erasing sensitivities, making it possible to overwrite by the use of a single laser beam.

BEST MODE FOR CARRYING OUT THE INVENTION

Embodiments of the present invention are described.

(Example 1)

A resin substrate on which a laser beam guide groove or grooves have been preliminarily formed is provided as a substrate on which a thin film used as a recording layer is to be formed. On the surface of the resin substrate is formed an inorganic dielectric layer which has a good heat resistance and is made, for example, of ZnS or $SiO_2$. The dielectric layer is preferably a ZnS dielectric layer which contains not less than 15 mole % of $SiO_2$. A thin film of a mixture of $Sb_2Te_3$, GeTe and excess Sb is formed on the dielectric layer.

The thin film may be formed by vacuum deposition or sputtering. In the triangular diagram of FIG. 1 consisting of $Sb_2Te_3$, GeTe and Sb, the composition of the thin film should preferably be selected from region 1 including point A of $Sb_2Te_3$ (35 mole %), GeTe (41 mole %) and excess Sb (24 mole %), point B of $Sb_2Te_3$ (27 mole %), GeTe (51 mole %) and excess Sb (22 mole %), and point C of $Sb_2Te_3$ (425 mole %), GeTe (29 mole %) and excess Sb (29 mole %).

This may be represented by a ratio of GeTe to $Sb_2Te_3$ and a ratio of excess Sb to $Sb_2Te_3$, which are, respectively, selected from the following ranges that $0.5<GeTe/Sb_2Te_3<2.0$ and $10<excess\ Sb<30$. In the triangular diagram, the compositional range is around dotted line 2 where the excess Sb content is about 25 mole %. The compositional points around the 25 mole % line are the most important.

Figure 2:
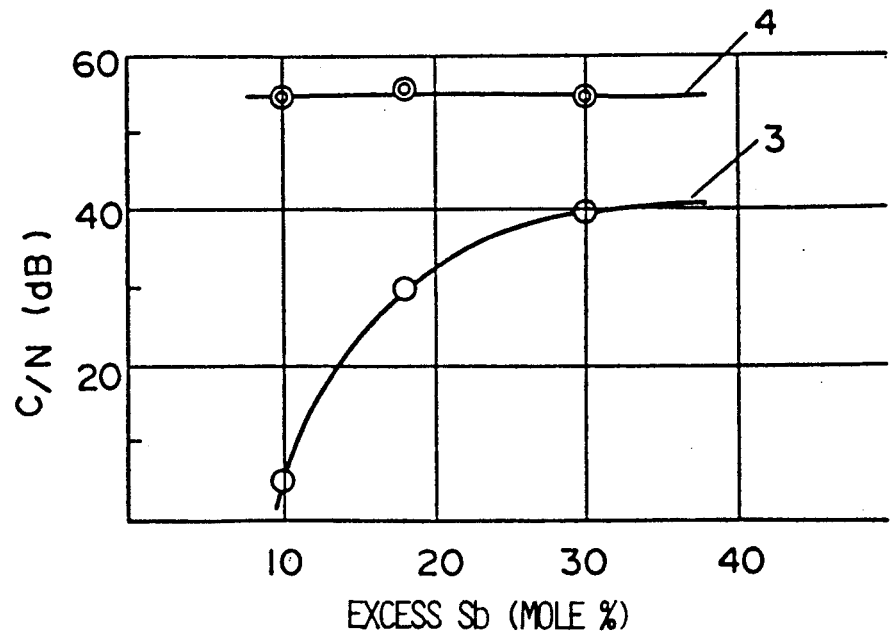
FIG. 2 is a graph showing the dependence of the recording sensitivity (C/N ratio) of the medium on the ratio of excess $Sb/Sb_2Te_3$.

In FIG. 2, there is shown the relation between the sensitivity and the composition of the respective films. In this figure, $GeTe/Sb_2Te_3 \approx 1.2$ and the values of excess $Sb/Sb_2Te_3$ are 10, 18 and 30, respectively. As the excess Sb increases, the C/N value in a low laser power region of 6 mw increases as shown by curve 3. Thus, the sensitivity is improved. However, for the laser power of 9 mW, the C/N value is about 55 dB in any compositional points as shown by curve 4.

When the $GeTe/Sb_2Te_3$ ratio increases so that GeTe becomes rich, the sensitivity lowers. Moreover, the relationship between the cycle characteristic and the composition may be expressed in such a manner that when a variation of C/N relative to the number of cycles is taken as $\Delta C/N$, the magnitude of $\Delta C/N$ in connection with excess $Sb/Sb_2Te_3$ is in the following order. $\Delta C/N_{10} < \Delta C/N_{18} < \Delta C/N_{30}$. Preferably, $Sb/Sb_2Te_3 < 20$.

The recording medium of this example has so high a crystallization rate that a single beam may be used for recording.erasing procedures.

Figure 1:
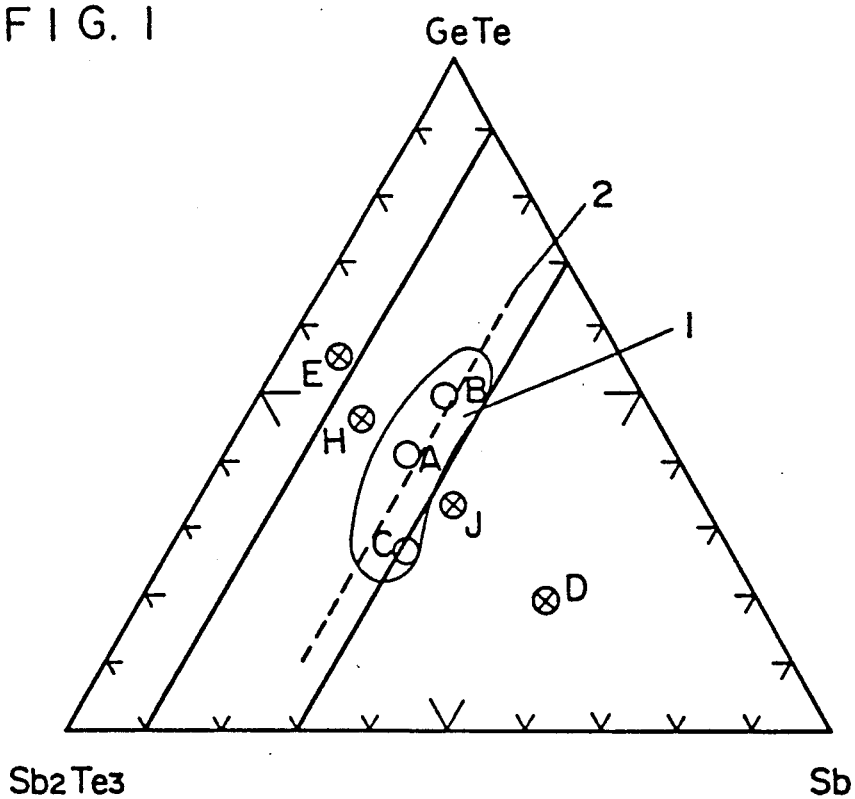
FIG. 1 is a triangular diagram for the composition of recording thin film used in an optical information recording medium according to one embodiment of the invention.

In the triangular diagram of FIG. 1, at points E and H where the excess Sb is smaller than the 25 mole % line of Sb the cycle characteristic deteriorates considerably. Moreover, at point J where the excess Sb content is larger than the 25 mole % line, the deterioration of the cycle characteristic also increases. At point D where the Sb content is higher than at point J, the recording sensitivity and C/N ratio lower.

(Example 2)

Figure 3:
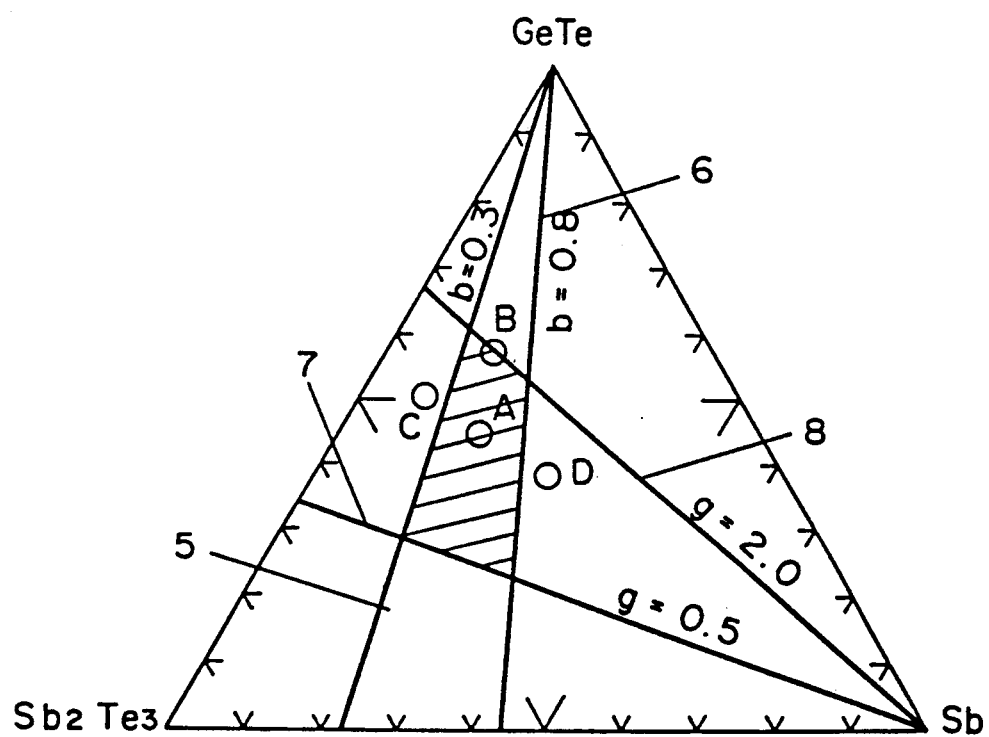
FIG. 3 is a triangular diagram for the composition of recording thin film used in an optical information recording medium according to another embodiment of the invention.

The composition of a mixed thin film consisting of $Sb_2Te_3$, GeTe and excess Sb is selected from the region between the lines $b = Sb/Sb_2Te_3 = 0.3$ and $b = Sb/Sb_2Te_3 = 0.8$ in the triangular diagram for $Sb_2Te_3$, GeTe and Sb shown in FIG. 3.

In the compositional region where b is less than 0.3, inclusive, crystallization is unlikely to occur smoothly during recording, erasing cycles of information. On the contrary, in the compositional region where b is 0.8 or over, amorphization is not likely to occur smoothly during recording, erasing cycles of information. The cycle characteristic becomes stabler in the region of $0.3 < b < 0.8$.

As for $g = Sb/Sb_2Te_3$, when g is not larger than 0.5, the transition temperature for crystallization lowers with a lowering of thermal stability.

A disk of 130 mm$\phi$ at compositional point A where $g = 1.2$ and $b = 0.5$ was made. When this disk was subjected to measurement of an overwrite cycle characteristic of a signal of $f_1 = 3.43$ MHz and a signal of $f_2 = 1.6$ MHz at a frequency of 180 r.p.m., the C/N ratio and an erasure rate do not deteriorate over $10^5$ cycles or over for both a high power level of 16 mw and a low power level of 8 mw.

Higher recording sensitivity is obtained at a smaller value of g or b. With regard to the thermal stability, it becomes better at a higher value of g or b. The values of g and b can be properly selected from the triangular diagram in correspondence with the number of disk rotation.

At compositional point B where $g = 2.0$ and $b = 0.5$, the C/N ratio and the erasure rate do not lower over $10^5$ cycles or over for a recording power level of 18 mw and an erasing power level of 10 mw. However, the sensitivity is lower than at compositional point b.

At compositional point C which is outside from $b = 0.3$, the sensitivity is improved at a point where $g = 1.2$ and $b = 0.2$, but crystallization slightly varies at about $10^4$ cycles.

At compositional point D which is outside from $b = 0.8$, the sensitivity for amorphization is slightly improved at $g = 1.2$ and $b = 1.0$, but amorphization slightly varies at about $10^4$ cycles.

INDUSTRIAL UTILIZATION

In a recording member for recording, reproducing and erasing information by the use of a laser beam, a recording thin film of a composition consisting of $GeTe-Sb_2Te_3-Sb$ wherein excess Sb is contained can reduce a variation in crystallization or amorphization and ensures a good cycle performance. Further, the disk sensitivity and thermal stability are improved. Accordingly, there can be provided a useful recording medium which is capable of recording, reproduction, erasure in optical disk files or the like.

We claim:

1. An erasable optical information recording medium characterized in that a recording thin film made of three components of a GeTe alloy, an $Sb_2Te_3$ alloy and excess Sb is selected such that 10 mole % < excess Sb < 30% mole %, is formed on a substrate, said recording thin film having the capability of being heated, melted by irradiation of a laser beam and being converted into amorphization by quenching and having the capability of crystallization by heating the thin film in the amorphous state by irradiation of a laser beam.

2. An optical information recording medium according to claim 1, characterized in that the amount of the excess Sb in the three components of GeTe, $Sb_2Te_3$ and excess Sb is selected such that 10 mole % < excess Sb < 30 mole %.

3. An optical information recording medium according to claim 2, characterized in that the ratio of the excess Sb and the $Sb_2Te_3$ in the GeTe, $Sb_2Te_3$ and excess Sb is selected such that $0.3 < b < 0.8$ (wherein $b = $ excess $Sb/Sb_2Te_3$).

4. An optical information recording medium according to claim 2 characterized in that the ratio of GeTe and $Sb_2Te_3$ in the GeTe, $Sb_2Te_3$ and excess Sb is selected such that $0.5 < g < 2.0$ (wherein $g = GeTe/Sb_2Te_3$).

5. An optical information recording medium according to claim 1, characterized in that said medium comprises the substrate having a dielectric layer formed thereon, the recording thin film consisting of the GeTe, $Sb_2Te_3$ and excess Sb and formed on the dielectric layer, a dielectric layer formed on the thin film, and a reflection layer formed on the second-mentioned dielectric layer.

6. An optical information recording medium according to claim 3, characterized in that the ratio of GeTe and $Sb_2Te_3$ in the GeTe, $Sb_2Te_3$ and excess Sb is selected such that $0.5 < g < 2.0$ (wherein $g = GeTe/Sb_2Te_3$).

* * * * *